(12) United States Patent
Harrison

(10) Patent No.: US 11,444,958 B2
(45) Date of Patent: Sep. 13, 2022

(54) WEB SERVER SECURITY

(71) Applicant: GARRISON TECHNOLOGY LTD, London (GB)

(72) Inventor: Henry Harrison, Greater London (GB)

(73) Assignee: GARRISON TECHNOLOGY LTD, London (GB)

( * ) Notice: Subject to any disclaimer, the term of this patent is extended or adjusted under 35 U.S.C. 154(b) by 398 days.

(21) Appl. No.: 16/333,272

(22) PCT Filed: Apr. 27, 2018

(86) PCT No.: PCT/GB2018/051111
§ 371 (c)(1),
(2) Date: Mar. 14, 2019

(87) PCT Pub. No.: WO2018/220341
PCT Pub. Date: Dec. 6, 2018

(65) Prior Publication Data
US 2021/0288978 A1    Sep. 16, 2021

(30) Foreign Application Priority Data
Jun. 1, 2017  (GB) ...................... 1708750

(51) Int. Cl.
*H04L 9/40* (2022.01)
*H04L 5/00* (2006.01)
*H04L 49/00* (2022.01)
*H04L 69/326* (2022.01)

(52) U.S. Cl.
CPC ........ *H04L 63/1416* (2013.01); *H04L 5/0044* (2013.01); *H04L 49/3072* (2013.01); *H04L 69/326* (2013.01)

(58) Field of Classification Search
CPC .............. H04L 63/1416; H04L 5/0044; H04L 49/3072; H04L 69/326
See application file for complete search history.

(56) References Cited

U.S. PATENT DOCUMENTS

| | | | |
|---|---|---|---|
| 2004/0088425 A1 | 5/2004 | Rubinstein et al. | |
| 2007/0136809 A1 | 6/2007 | Kim et al. | |
| 2008/0022386 A1 | 1/2008 | Shevchenko | |
| 2010/0162382 A1 | 6/2010 | Kim et al. | |
| 2013/0163594 A1* | 6/2013 | Sharma | H04L 45/66 370/392 |
| 2014/0101764 A1 | 4/2014 | Montoro | |
| 2014/0337407 A1 | 11/2014 | Mraz et al. | |

FOREIGN PATENT DOCUMENTS

KR          101639428        7/2016

* cited by examiner

*Primary Examiner* — Brian Whipple
(74) *Attorney, Agent, or Firm* — Occhiuti & Rohlicek LLP

(57) ABSTRACT

A system (30) for protecting a server (20) from network attacks is provided. The system (30) comprises a data splitter (31) and a parameter extractor (33). The data splitter (31) is configured to receive network communications from a client (10); send network data comprising at least payload information included in the received network communications to the parameter extractor (33); and send network data comprising at least communication state information included in the received network communications to the server (20). The parameter extractor (33) is configured to apply predefined parameter extraction rules to network data received from the data splitter (31) in order to extract parameters, and to forward extracted parameters to the server (20). The system (30) is also configured to enforce unidirectional dataflow over at least part of the network connection path to the server (20) via the parameter extractor (33), such that dataflow to the server (20) over the network connection path is allowed, but dataflow in the opposite direction is not allowed for at least part of the network connection path. A server (20), data splitter (31) and parameter extractor (33) for use with the system (30) are also provided, and a corresponding method for protecting a server (20) from network attacks is provided.

20 Claims, 3 Drawing Sheets

WEB SERVER SECURITY

TECHNICAL FIELD

The invention relates to systems and methods for protecting web servers from network attacks.

BACKGROUND

Operators of websites typically wish to defend their web servers against attack from Internet-based parties who seek to compromise the logic of those web servers. The attacker's objective may be to gain access to confidential information or systems which are in turn connected behind the web server, or to serve their own content to website visitors, such as defaced graphics, political messages, or malicious software.

One approach is to separate the web server logic into tiers. The first 'presentation' tier is responsible for managing communication with the website visitor's machine and browser. This involves processing communications protocols including TCP/IP, Transport Layer Security (TLS) and HTTP and extracting parameters which are then passed to a 'business' tier which determines an appropriate response. That response is then returned to the presentation tier which then formats the response into the relevant protocols for return to the visitor's machine and browser.

In this approach, communications to the business tier can be confined to well-specified interfaces and parameters which can be carefully validated in order to reduce the risk that a malicious visitor might compromise the business tier logic.

It is however also desirable to protect the presentation tier from attack. An attacker who is able to compromise the presentation tier would be able to return their own response to other website visitors (rather than the response specified by the business tier) or record confidential information being returned from the business tier destined for other website visitors and then communicate it to an Internet host controlled by the attacker.

Unfortunately, the processing requirements for the presentation tier are sufficiently complex that it is commercially unaffordable to develop high assurance implementations that would provide high robustness against attempted attacks. As a result, defending the presentation tier depends on a raft of layered defences including keeping software patched against known vulnerabilities. Protection of the presentation tier against attacks which exploit unknown ('zero-day') vulnerabilities is difficult.

It is an object of embodiments of the present invention to provide reliable and commercially affordable ways of protecting a web server, and thereby also protect website visitors and others, from network attacks.

SUMMARY OF THE INVENTION

The invention is defined in the independent claims to which reference is now directed. Preferred features are set out in the dependent claims.

According to a first aspect of the present invention, there is provided a system for protecting a server from network attacks. The system comprises a data splitter and a parameter extractor. The data splitter is configured to receive network communications from a client; send network data comprising at least payload information included in the received network communications to the parameter extractor; and send network data comprising at least communication state information included in the received network communications to the server. The parameter extractor is configured to apply predefined parameter extraction rules to network communications received from the data splitter in order to extract parameters, and to forward extracted parameters to the server. The system is configured to enforce unidirectional dataflow over at least part of the network connection path to the server via the parameter extractor, such that dataflow to the server over the network connection path is allowed, but dataflow in the opposite direction is not allowed for at least part of the network connection path.

The combination of a parameter extractor that is logically separate from the server and a data splitter that provides communication state information to the server reduces the risk of the server becoming compromised by network communications, but at the same time allows the server to maintain stateful communication sessions with client systems using state-sensitive, connection-oriented, communication protocols such as TCP.

As explained above, the complexity of parameter extraction processing can be high, such that it is difficult to implement the processing of a communication's payload, to extract parameters, in a high assurance manner. By providing a separate parameter extractor, the server is not required to perform parameter extraction processing on the payloads of network communications. While the parameter extractor itself may still be vulnerable to being compromised, its logical separation from the server reduces the risk of the server becoming compromised. The addition of unidirectionality on at least part of the network connection path to the server via the parameter extractor reduces the ability of a compromised parameter extractor to cause security issues. In particular, having such unidirectionality at least prevents the parameter extractor from returning data obtained from the server to a network-based host controlled by an attacker. The presence of the data splitter solves communication state problems that could otherwise arise from the separation of the processing of received communications from the server. For example, bi-directional communication sessions that use state-sensitive, connection-oriented, protocols such as TCP require the exchange of SYN and ACK messages to maintain the session. The splitter provides the server with communication state information, such as packet headers, separately to the provision of extracted parameters by the parameter extractor. This allows the server to maintain a stateful communication session, and formulate responses at a protocol-level, without extracted parameters and without having to process the payload.

As used herein, the enforcement of "unidirectional dataflow" between two endpoints of a data path will be understood to mean that steps have been taken to prevent information sent in one of the two directions from being communicated outside of the receiving endpoint. This may be in the form of a communication arrangement that only allows data to usefully flow in one direction, even if signalling flows bi-directionally.

While unidirectional dataflow can be enforced using a truly, physically, unidirectional data path that prevents the physical transmission of any data in one direction, it can also be implemented at an endpoint of the data path, either in software, hardware or a combination of the two. For example, the data path between the data splitter and the parameter extractor may physically allow data to be transmitted in both directions and allow data sent from the parameter extractor to reach the data splitter, but the data splitter may be configured (through software, or through hardware or a combination of hardware and software) such that it ignores or cannot process data it receives from the parameter extractor. In this way, although the data path is physically bidirectional, the data splitter does not allow information it receives from the parameter extractor to be communicated outside of the data splitter and therefore unidirectional dataflow is enforced.

In some embodiments described herein, an endpoint of a unidirectional data path may be implemented so that the endpoint ignores or cannot process any network data that it receives, but the endpoint will not completely ignore some predefined signalling data. For example, the parameter extractor may send signals to the data splitter to confirm it has successfully received a packet. In these embodiments unidirectional dataflow is still enforced because steps may still be taken to ensure that information which may be covertly encoded in these signals (using the timing of the signals for examples) cannot be communicated outside of the data splitter. As explained above, what is important is that steps have been taken to prevent information sent in one of the directions from being communicated outside of the receiving endpoint.

The communication state information may comprise information for maintaining a stateful communication session for a connection-oriented communication protocol, such as TCP. The received communications may be encrypted using TLS. The communication state information may comprise packet headers, or a portion of the packet headers, of received network communications.

Sending network data to the server may comprise sending the received network communications to the server. That is, the data splitter may forward communications received from the client, including the associated communication state information, to the server without modifying the received communication. In this case, the server may be configured to ignore payload information included in the network communications received from the data splitter. This approach allows the splitter to be implemented in a simple manner, in that the splitter can simply act as a tap that routes one copy of a received communication to the server and another copy of the received communication to the parameter extractor.

Alternatively, the data splitter may be further configured to process the received network communications to remove payload information to produce cleared data, the cleared data comprising communication state information included in received network communications. Sending network data to the server may then comprise sending the cleared data to the server. Processing received network communications to produce cleared data may comprise overwriting a payload of a received network communication, for example with zeroes or other meaningless data. Alternatively, the data splitter may remove a payload of a received network communication. This approach means that the server does not receive and is therefore not at any risk from payload information included in the network communications: it only receives extracted parameters via the parameter extractor and cleared data via the splitter. This provides higher assurance than the alternative approach in which the server is configured to ignore payload information, in which there is a residual risk that the configuration of the server could be changed by a well-meaning person in charge of the server.

The system may be configured to enforce unidirectional dataflow over at least part of the network connection path between the parameter extractor and the server, such that dataflow from the parameter extractor to the server over the network connection path is allowed, but dataflow from the server to the parameter extractor over the network connection path is not allowed. This prevents the leaking of data from the server to an attacker, via a compromised parameter extractor.

The system may additionally or alternatively be configured to enforce unidirectional dataflow over at least part of the network connection path between the parameter extractor and the client. In other words, unidirectional dataflow may be enforced between the parameter extractor and a boundary of a local network that comprises the system, such that dataflow to the server over the first network connection path is allowed, but the parameter extractor cannot communicate with any network-based host outside the boundary of the local network. Such unidrectionality may be enforced on either or both logical sides of the data splitter. Enforcing unidirectionality in this way prevents a potentially compromised parameter extractor from sending any data to network-based entities. This can include sensitive data that the parameter extractor may have received from the server (if, for example, no unidirectionality is enforced between the server and parameter extractor), sensitive data included in network communications received from a valid client (a password, for example), and data included in network communications received from malicious clients which may otherwise be served by the parameter extractor to valid clients, as part of a Denial of Service (DoS) attack, for example.

The parameter extractor may be configured to signal to the data splitter to confirm when it has successfully received network data from the data splitter, and the data splitter may be configured to only send network data to the server when the parameter extractor has signalled that it has successfully received the network data sent by the data splitter. This can prevent a situation in which the server successfully receives a packet (or at least communication state information associated with the packet) from the data splitter, but the parameter extractor does not receive the packet (or at least its payload information along with information necessary to properly re-assemble the stream and/or inform the server of the stream to which the extracted parameters apply). Such a situation could potentially disrupt or cause a break down in a communication session because the parameter extractor may not be able to reconstitute the full content of a communication from the client, and will thus typically be unable to extract the correct parameters and/or inform the server of the stream to which the parameters relate.

The data splitter may be configured to prevent information included in the signals from the parameter extractor from propagating further than the data splitter. A communication link for signalling packet delivery could be used as a covert channel to carry information from the parameter extractor. For example, the parameter extractor may covertly send information by encoding information into the timing of the reverse signals. By ensuring information included in the signals from the parameter extractor from propagating further than the data splitter, the signalling cannot be used by a compromised packet extractor as a means of sending information to any computer outside of the system.

The parameter extractor may be configured to extract one or more GET parameters from HTTP GET requests, and/or one or more POST parameters from HTTP POST requests. HTTP GET and POST requests are useful in many web server applications, but can be used by malicious third parties to try to compromise the server. Embodiments of the present invention secure the server against potentially malicious HTTP GET and POST requests.

The data splitter may be implemented in hardware, software running on a processor, or a combination of hardware and software. The data splitter may preferably be implemented in hardware or a combination of hardware and software, as implementations at least partly based in hardware may be higher assurance and more difficult to compromise without access to the internals of the physical unit that implements the data splitter. For example, the functionality of the data splitter may be logically hardwired, and may be implemented using a programmable logic device, a field-programmable gate array, an application-specific integrated circuit, or a logic block that executes instructions stored in a read-only memory. The functionality may also be implemented using software developed using high assurance methods.

The system may further comprise a parameter validator located between the parameter extractor and the server, the parameter validator being configured to: receive extracted parameters from the parameter extractor; apply predefined rules for implementing predefined validation criteria to the received parameters; and send parameters meeting the predefined validation criteria to the server. By only allowing the passage of parameters that meet predefined criteria, the parameter validator helps prevent the communication of parameters from the parameter extractor to the server from being used as a mechanism for compromising the server.

The system may be configured to enforce unidirectional dataflow between the parameter extractor and the parameter validator, such that dataflow from the parameter extractor to the parameter validator is allowed, but dataflow from the parameter validator to the parameter extractor is not allowed. In this way, efforts by a compromised parameter extractor to compromise the parameter validator are restricted to manipulating the content of the parameters passed to the parameter validator.

The parameter validator may comprise a unidirectional dataflow enforcer, with the unidirectional dataflow between the parameter extractor and the parameter validator being enforced using said unidirectional dataflow enforcer.

The system may be configured to enforce unidirectional dataflow between the parameter validator and the server, such that dataflow from the parameter validator to the server is allowed, but dataflow from the server to the parameter validator is not allowed. This prevents any dataflow from the server to the parameter validator and therefore also the parameter extractor, preventing the network connection path to the server via the parameter extractor and parameter validator from being used to leak data from the server.

The parameter validator may be implemented in hardware, software, or a combination of hardware and software. The choice of implementation is a trade-off between complexity and security: the implementer may choose to make the definition of the interface to the server simple in order to allow cost-effective implementation of the parameter validator in a high-assurance fashion such as using an FPGA or software developed using formal methods. For a more complex interface, this might become unaffordable and the implementation of the parameter validator might become more vulnerable to compromise by a compromised parameter extractor.

The parameter extractor may be preconfigured with encryption-related data of the server so that the system can establish encrypted communication sessions with network-based clients. For example, the parameter extractor may be preconfigured with encryption-related data of the server, such as a certificate of the server, so that the parameter extractor can generate a secret key from extracted parameters, so that the parameter extractor can decrypt network communications received from the data splitter. For security reasons it is often desirable for communications between a server and a client to be encrypted. Providing the parameter extractor with encryption-related data of the server allows this.

The predefined parameter extraction rules may comprise a rule for extracting a key exchange parameter. The key exchange parameter may be a client random string and/or a pre-master secret. In order for the parameter extractor to decrypt encrypted communications received from the client via the data splitter, and in order for the server to encrypt communications sent to the client, the server and parameter extractor may need to know a key, string or other data that is provided by the client in one or more initial or early communications from the client. Configuring the parameter extractor with a rule for extracting such data may therefore allow encrypted communication sessions using some encryption methodologies.

The parameter extractor may be configured to decrypt encrypted network communications received from the data splitter before applying the predefined parameter extraction rules.

The parameter extractor may be implemented in software. As explained above, the processing required for the parameter extraction functionality may be complex, such that software-based applications are most cost-effective, even though this may leave the parameter extractor more vulnerable to compromise. The other elements of the system, which may be implemented in a more high assurance manner to provide additional security, provide additional protection to the server.

The parameter extractor may comprise a logic block that is configured to request boot instructions over a boot interface on power-up or reset of the logic block, such that on power-up or reset the parameter extractor is placed in a predetermined active state resulting from executing the boot instructions. As explained above, the parameter extractor may be vulnerable to compromise. To avoid the persistence of such a compromise after power-up or reset, clean boot instructions for the parameter extractor may be stored outside of the logical boundary of the parameter extractor, and may be automatically obtained by the parameter extractor upon power-up or reset.

The logic block may comprise a control connection for powering-up or resetting the logic block so that another computer system can power-up or reset the logic block. This allows a connected computer system to flush the parameter extractor, placing it in the predetermined active state, on demand. This way the parameter extractor can be reset if it becomes apparent that is compromised, or if assurance is required that the parameter extractor is not compromised.

The logic block may be preconfigured to communicate over the boot interface according to a communication protocol in a manner which cannot be altered by instructions executed by the logic block. For example, the logic block may be preconfigured by being logically hardwired to communicate over the boot interface using the communication protocol or using instructions stored on a read only memory. In this way, malicious code operating through the parameter extractor cannot change the behaviour of the parameter extractor on power-up or reset, and therefore cannot affect the predetermined active state.

The system may comprise one or more unidirectional dataflow enforcers for enforcing unidirectional dataflow, the one or more unidirectional dataflow enforcers being implemented in hardware, software, or a combination of hardware and software.

The one or more unidirectional dataflow enforcers may implemented in hardware. The one or more unidirectional dataflow enforcers may each comprise an optical link, the optical link comprising transmission hardware, such as a laser, and receiving hardware. The unidirectional dataflow enforcer may comprise an electronic transmission link, for example one connection of a serial port that uses different connections for each direction of communication, with electronic transmission only occurring in one direction. Pure hardware implementations are particularly high assurance because their behaviour cannot be changed without physically accessing the hardware.

The one or more unidirectional dataflow enforcers may be implemented in a combination of hardware and software. Mixed implementations provide a compromise between high security and ease and cost of implementation.

The one or more unidirectional dataflow enforcers may be a custom electronic device, implemented purely in hardware or a combination of hardware and software. The custom electronic device is a programmable logic device, a field-programmable gate array or an application-specific integrated circuit.

The system may be implemented completely physically and/or logically separately from the server. However, the system may further comprise the server.

The server may be configured to formulate responses to the network communications received by the data splitter using the parameters received from the parameter extractor.

The server may be configured to formulate protocol-level responses to network communications received by the data splitter using the communication state information included in the data received from the data splitter.

The server may be configured to use the communication state information included in the data received from the data splitter to respond to network communications received by the data splitter with SYN or ACK packets.

A server configured for use in or with the system or protecting a server from network attacks is also provided.

A parameter extractor configured for use in the system or protecting a server from network attacks is also provided.

A data splitter configured for use in the system or protecting a server from network attacks is also provided.

A corresponding method for protecting a server from network attacks is also provided. The method comprises: receiving network communications from a client at a data splitter; sending network data comprising at least payload information included in the received network communications from the data splitter to a parameter extractor; sending network data from the data splitter comprising at least communication state information included in the received network communications to the server; applying, by the parameter extractor, predefined parameter extraction rules to the network data received from the data splitter in order to extract parameters, and forwarding extracted parameters to the server; and enforcing unidirectional dataflow over at least part of the network connection path to the server via the parameter extractor, such that dataflow to the server over the connection path is allowed, but dataflow in the opposite direction is not allowed for at least part of the network connection path.

BRIEF DESCRIPTION OF THE DRAWINGS

The invention will now be further described by way of example only and with reference to the accompanying figures in which.

DETAILED DESCRIPTION

Figure 1:
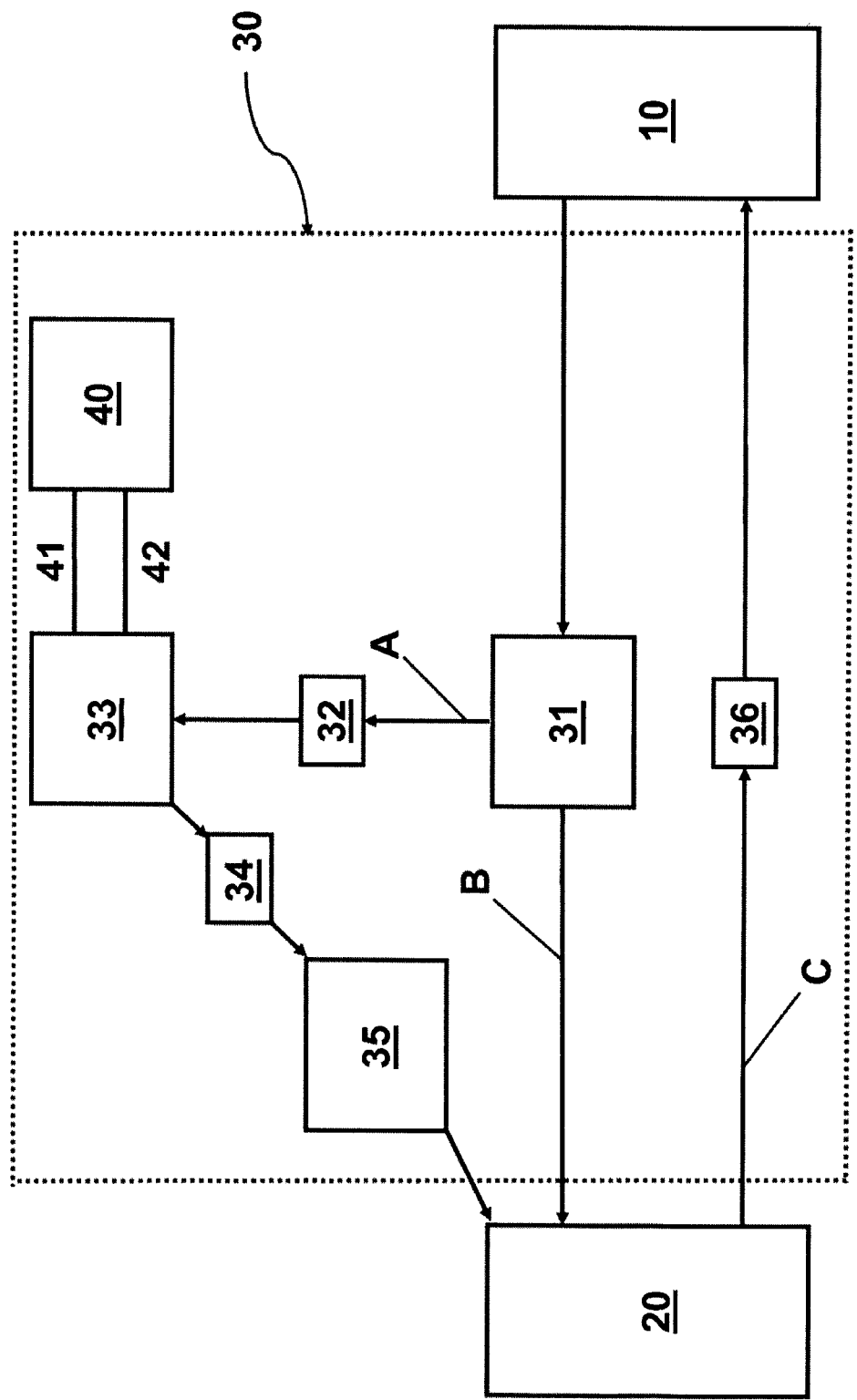
FIG. 1 is a schematic diagram illustrating a system for protecting a server from network attacks in accordance with embodiments of the present invention.

FIG. 1 shows a system 30 for protecting a server 20 from network attacks, in accordance with embodiments of the present invention.

The system 30 of FIG. 1 includes a data splitter 31, which may also be referred to as a clearance block or data clearance block 31, a first unidirectional dataflow enforcer 32, a parameter extractor 33, a second unidirectional dataflow enforcer 34, a parameter validator 35 and a third unidirectional dataflow enforcer 36. The system 30 is located between a client 10 and the server 20, which are communicating with each other using a packet-based communication protocol, for example a reliable packet-based communication protocol such as TCP/IP. Also shown is a storage controller 40 connected to the parameter extractor 33.

Before describing the exemplary functions and implementations of the various elements shown in FIG. 1, it should be appreciated that the various elements and their relative connections are depicted as they are for ease of illustration and explanation, and that this depiction is not intended to limit the invention. For example, and as will be understood from the detailed description below, while the elements appear in FIG. 1 as physically or logically distinct blocks, various elements may be implemented within the same physical or logical unit and/or may be implemented entirely in software. Further, not all of the elements depicted in FIG. 1 and described below are essential.

It should also be appreciated that the connections shown between the client 10, system 30 and server 20 are simplified for ease of illustration and explanation. In practice, the server 20 will typically be connected to and be capable of communicating with many different client systems 10, and the precise topology of the connection between the clients 10 and the server is not important. While the connection from the client 10 to the server 20 and the connection from the server 20 to the client 10 may appear from FIG. 1 to be physically separate connection paths, this need not be the case.

Turning to the elements of FIG. 1, the data splitter 31 receives communications from the client 10 over a network such as the Internet and sends data included in the received communications to the server 20 via two logically and/or physically distinct paths: a first path (indicated by 'A' in FIG. 1) via the parameter extractor 33, and a second path (indicated by 'B' in FIG. 1) that does not pass through the parameter extractor 33.

The data sent to the server 20 via the first path, via the parameter extractor 33, includes payload information included in the communications received from the client 10. In some embodiments, the data splitter 31 simply forwards the received communications over the first path without modifying them. However, in other examples, the data splitter 31 removes or overwrites other information included in the received communication, for example by removing some fields from the TCP packet headers. The data splitter 31 will not typically completely remove the packet headers because the parameter extractor 33 may need at least some fields of the packet headers to properly re-assemble the stream, and/or may need at least some fields to be able to inform the server of the stream to which the extracted parameters apply. Therefore, in some embodiments, in addition to payload information, the data splitter 31 forwards at least the fields corresponding to the origin IP address, port number and sequence number.

Some communications destined for the server, such as TCP SYN messages, are protocol-level messages and do not include any payload information. Therefore, in some embodiments, the data splitter 31 may not send anything to parameter extractor if a received communication does not include any payload information. However, in other embodiments the data splitter 31 still sends some or all of the fields of the TCP packet headers to the parameter extractor 33, even if there is no payload information.

The data sent to the server 20 via the second path includes communication state information included in the communications received from the client 10. Communication state information is information that indicates a state of a communication session between the client 10 and the server 20, and is used by the client 10 and server 20 to maintain, or track, the state of the communication session. In TCP, examples of communication state information include the packet sequence numbers and acknowledgement numbers that are included in the TCP header, together with the other party's IP address and port number. The data splitter 31 may therefore send all or a portion of a header included in received communications to the server 20 over the second path.

In some embodiments, the data splitter 31 forwards received communications to the server over the second path without modifying them. Such embodiments have the advantage that the data splitter 31 can be implemented in a very simple manner, as the data splitter 31 may simply duplicate received communications and forward one copy over the first path and the other copy over the second path. However, a drawback of this approach is that the server 20 receives all of the data sent from the client 10 over the second path, including the raw payload. While the server 20 can be configured to ignore the payload, there is a residual risk to the server 20 because the configuration of the server 20 can potentially be manually changed, and it might be very tempting for a well-meaning developer to seek to use the payloads directly rather than the data received via the parameter extractor and parameter validator.

In other embodiments, the data splitter 31 processes the communications received from the client 10 to remove payload information to produce cleared data, and then forwards the cleared data to the server 20. For example, the data splitter may remove or overwrite the payload. The payload can be overwritten with zeroes or other meaningless data that the server will ignore or with data that the server 20 is configured to ignore. The advantage of this approach over the more simple implementation of the data splitter 31 described above is that the server 20 never receives the raw payload over the second path. If the server 20 did receive the raw payload over the second path, it would be tempting for a well-meaning developer to use the payload directly.

The first unidirectional dataflow enforcer 32 is configured to enforce unidirectional dataflow on the first path between the data splitter 31 and the parameter extractor 33, such that dataflow from the data splitter 31 to the parameter extractor 33 is allowed, but dataflow from the parameter extractor 33 to the data splitter is not allowed. In other words, the first unidirectional dataflow enforcer 32 is configured to forward data it receives from the data splitter 31 to the parameter extractor 33, but it will not forward any data that it receives from the parameter extractor 33 to the data splitter 31.

More generally, what is important is that parameter extractor 33 cannot send any data to the client 10, or indeed to any other network-based host outside of the local network which includes the system 30. This means that the unidirectional dataflow enforced by the first unidirectional dataflow enforcer 32 could instead be implemented on the other logical side of the data splitter, between the client 10 and the data splitter 31. In other words, to achieve the desired result, unidirectional dataflow can be enforced anywhere between the parameter extractor 33 and the client 10, and in particular between the parameter extractor 33 and the boundary of the local network that includes the system 30, such that the parameter extractor 33 cannot send data to any network-based host.

In this way, the first path cannot be used to leak data from the server 20. Further, the parameter extractor 33 cannot be used to leak sensitive data (such as a password of a legitimate website visitor) included in communications received by the data splitter 31 and parameter extractor 33. Further still, the parameter extractor 33 cannot be used to serve up communications as part of a DoS attack. Preventing the parameter extractor 33 from communicating with any network-based host is advantageous, as the parameter extractor 33 is vulnerable to compromise by malicious network-based hosts.

The parameter extractor 33 is configured to receive data, such as the raw network communications that include the communication payload, from the first unidirectional dataflow enforcer 32. The parameter extractor 33 then applies predefined parameter extraction rules to the data in order to extract parameters from the data, and forwards the extracted parameters towards the server 20, via the second unidirectional dataflow enforcer 34 and the parameter validator 35. The parameter extractor 33 should not send any other data towards the server 20, only the extracted parameters.

The predefined parameter extraction rules are rules for extracting a subset of all of the information that might potentially be extracted from the data received at the parameter extractor 33, ignoring other pieces of information which potentially could be extracted. The parameters are parameters that may be used by the server 20 to formulate an appropriate response to the client 10 that sent the communication. For example, the parameters may be used in one or more database queries, may be communicated to other business logic, or may be used to encrypt and decrypt communications sent between the client 10 and server 20.

Specific examples of parameters that may be extracted by the parameter extractor 33, such as for an HTTP POST request, include:

The IP address and port of the sender;
A 'SessionID' cookie from the HTTP header;
A resource ID string from the portion of the URL after the third '/' character and before any '?' character; and/or
A string from the 'Infovalue' field in an HTML multipart form contained within the HTTP request.

Examples of parameters that the parameter extractor 33 may ignore, but which could potentially be extracted, for an HTTP POST request, include:

Other cookies contained in the HTTP header;
Other fields contained in the HTTP header;
Other parts of the URL;
Other fields in the form; and/or
Any other data supplied in the body of the HTTP POST.

As noted above, the logic required to apply the parameter extraction is typically quite complex: it may involve the interpretation of multiple communication layers, including the processing of protocols including TCP/IP, TLS and HTTP, as well as the application of relatively complex extraction rules. As a result, it is difficult to implement the parameter extractor 33 in a high assurance manner. This means that the parameter extractor 33 remains, relatively speaking, vulnerable to compromise by malicious third parties. However, the separation of the parameter extraction processing from the server alleviates the risk of the server 20 becoming compromised. Further, and as described in more detail herein, the presence of the other functional system elements, and the ability for these functional elements to be implemented in a high assurance manner, significantly improves the security of the server 20.

In some embodiments, the parameter extractor 33 includes a logic block (not shown) which executes instructions for performing parameter extraction, and which is connected to a storage controller 40 via a boot interface 41 and a control connection 42.

The logic block of the parameter extractor 33 may then be configured to request boot instructions from the storage controller 40 over the boot interface 41 on power-up or reset of the logic block. This behaviour of the logic block can be configured by preconfiguring the logic block to communicate over the boot interface according to a communication protocol in a manner which cannot be altered by instructions executed by the logic block. For example, the logic block may be preconfigured by logically hardwiring the logic block to communicate over the boot interface 41 using the communication protocol. This may be achieved through the electrical connection of the hardware pins, for example.

This means that the parameter extractor 33 will, upon power-up or reset, be placed a predetermined active end state that results from the execution of the boot instructions. This is advantageous because it protects the parameter extractor 33, which may become compromised during use, from the persistence of malicious code following power-up or reset. That is, while operators of the system 30 will understand that the parameter extractor 33 may become compromised during use, they can be sure that at the start of each new use (following power-up or reset) the parameter extractor 33 will function as intended.

The storage controller may also be able to power-up/reset the logic block, using the control connection 42. This allows the storage controller 40, which may itself be connected to a management computer system (not shown) managed by a system administrator, to force the parameter extractor into the known predetermined active end state. This way, if the operator of the system 30 becomes aware that parameter extractor 33 is or may be compromised, they can at any time force the parameter extractor 33 into a good state.

In some embodiments, steps may be taken at the storage controller 40 to ensure that instructions operating on the logic block of the parameter extractor 33 cannot lead to a change in the boot instruction stored and returned by the storage controller. For example, the boot interface 41 may be implemented as a very simple interface that can be implemented in a high assurance manner, configured only to receive requests from the parameter extractor 33 to serve boot instructions and to return boot instructions to the parameter extractor 33. For example, the storage controller 40 may be configured to refuse all write requests issued by the parameter extractor 33. The interface may be implemented using a PLD, FGPA or ASIC, for example.

The second unidirectional dataflow enforcer 34 is configured to enforce unidirectional dataflow on the first path between the parameter extractor 33 and the parameter validator 35, such that dataflow from the parameter extractor 33 to the parameter validator 35 is allowed, but dataflow from the parameter validator 35 to the data splitter is not allowed. In other words, the second unidirectional dataflow enforcer 34 is configured to forward data it receives from the parameter extractor 33 to the parameter validator 35, but it will not forward any data that it receives from the parameter validator 35 to the parameter extractor 33.

By enforcing unidirectional dataflow between the parameter validator 35 and the parameter extractor 33 in this way, efforts by a compromised parameter extractor 33 to compromise the parameter validator are restricted to manipulating the content of the parameters passed to the parameter validator. That is, the parameter extractor 33 cannot engage in bi-directional communications with the parameter validator 35, which may make the parameter validator 35 less vulnerable to some kinds of attack. This may be particularly useful where the parameter validator 35 is not implemented in a particularly high assurance manner, due to constraints placed by the complexity of the web server functionality.

The parameter validator 35 is configured to receive extracted parameters from the parameter extractor 33, via the second unidirectional dataflow enforcer 34, and apply predefined parameter validation rules for implementing predefined validation criteria to the received parameters. Parameters meeting the validation criteria are then sent to the server 20. The parameter validator 35 is therefore responsible for ensuring that the communication of parameters from the parameter extractor 33 to the server 20 cannot be used as a mechanism for compromising the server.

Parameter validation rules are chosen according to the requirements of the system, both in terms of the desired level of security (that is, stricter validation criteria can be used for higher security) and the desired functionality of the web server 20. With reference to the parameters extracted for the HTTP POST request described above, an exemplary set of parameter validation rules may include:

A flag such as the 'SessionID' cookie must be a universally unique identifier (UUID) in its canonical ASCII textual representation;

A flag such as the resource ID must be a numerical string that must have a value in a predefined range, such as between 1 and 10,000; and/or A string such as the 'Infovalue' string, when interpreted using UTF-8, must have a length in a predefined range, such as less than 100, and/or must not contain any of a predefined list of one or more forbidden glyphs.

The implementer may choose to define a simple interface to the server 20 in order to enable cost-effective implementation of strict validation rules in a high-assurance fashion, such as using an FPGA or software developed using formal methods.

It will be appreciated from the above discussion that the server 20 receives data that includes communication state information, from the data splitter 31 via the second path B, and parameters that have been extracted by the parameter extractor 33 and validated by the parameter validator 35, from the parameter validator 35 via the first path A. Using the parameters and suitable information such as the IP address and port of the sender, or equivalent information such as a hash function computed on that data, the server 20 is then able to formulate and send responses to the communications received from the client 10, while maintaining a stateful communication session using the communication state information. As will be appreciated, the server 20 is able to do this without processing the raw payload of the communications to extract parameters: this processing is performed by parameter extractor 33. The server 20 either does not receive the raw payload at all (in the case that the data splitter 31 forwards cleared data to the server 20) or receives it but can simply ignore or discard the payload (in the case that the data splitter 31 forwards the raw communications to the server 20). In this way, the server 20 does not lose any functionality, but is significantly less vulnerable to compromise.

In more detail, the server 20 uses the communication state information to formulate responses at the protocol level. That is, the server uses the communication state information to progress the communication with the client 10 at a protocol level. For example, in the case of TCP, the server 20 can respond to the client 10 with SYN or ACK packets having the correct header information and the correct packet sequence numbers.

Figure 2:
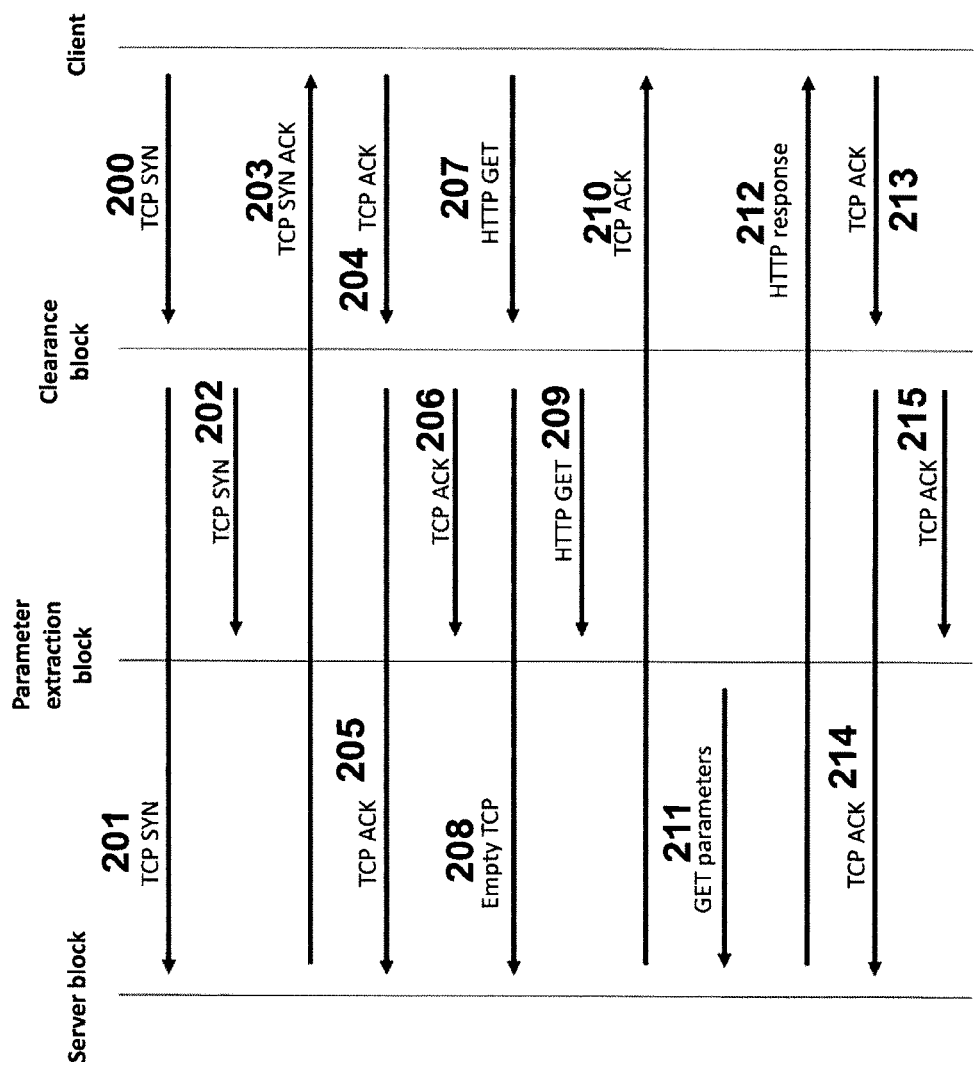
FIG. 2 is a sequence diagram illustrating a communication session between a client and server in accordance with embodiments of the present invention.

Similarly, the server 20 can formulate the protocol-level parts of substantive responses which also involve the results of the use of the extracted parameters. FIG. 2, described below, includes examples of how communication state information may be used by the server 20.

Figure 3:
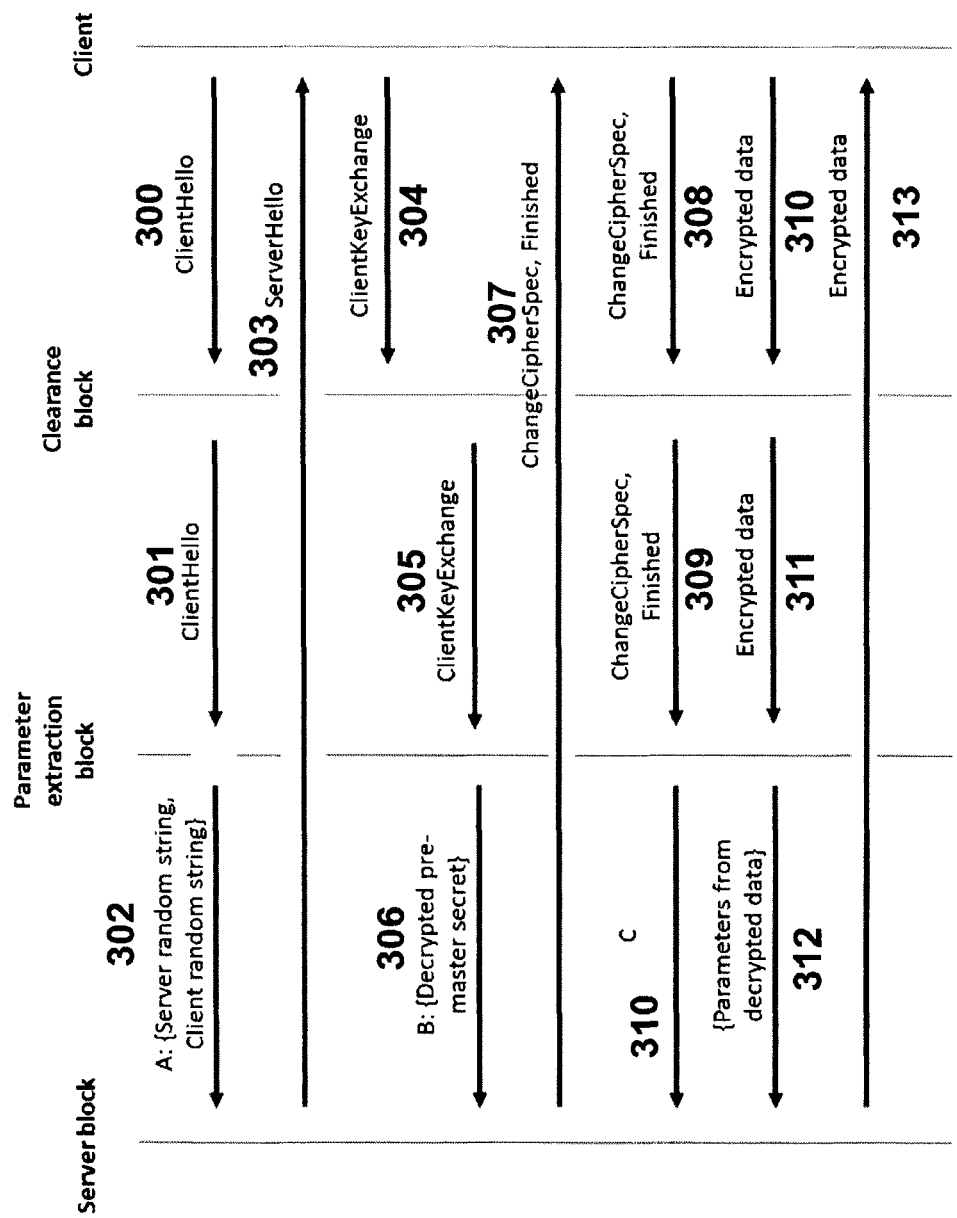
FIG. 3 is a sequence diagram illustrating a message flow for establishing an encrypted communication session in accordance with embodiments of the present invention.

The server 20 uses the extracted parameters to determine suitable responses at a substantive level. For example, the parameters may be used in one or more database queries, may be communicated to other business logic, or may be used to encrypt and decrypt communications send between the client 10 and server 20. FIGS. 2 and 3, described below, include examples of how extracted parameters may be used by the server 20.

In order for the server 20 to be able to send responses and other communications to the client 10, there must be a return data path from the server to the client. This is shown in FIG. 1 as data path C. The return data path should, preferably, not be capable of being used as a back-door to the server 20, and so the return path C is shown as including a third unidirectional dataflow enforcer 36 to prevent the flow of data to the server 20 over the return path. It should be appreciated that while FIG. 1 shows the return path C as being a separate path to path B, this is for ease of illustration and alternative arrangements are possible. For example, path B in FIG. 1 may in fact be a bi-directional path, especially in embodiments in which the data splitter 31 forwards two copies of received communications via the first path A and the second path B.

It will therefore be appreciated that the system 30 described above improves the security of web servers 30 by taking away the requirement for the server itself to process received data to extract parameters, but does so without reducing the functionality of the server and, in particular, can be used with connection-oriented protocols such as TCP.

However, problems may arise for the system 30 if a packet (or at least communication state information associated with the packet) is successfully delivered to the server 20 from the data splitter 31 but the packet (or at least its payload information along with information necessary to properly re-assemble the stream and/or inform the server of the stream to which the extracted parameters apply) is not successfully delivered to the parameter extractor 33 from the data splitter 31. This may happen if, for example, the parameter extractor 33 is busy or has a full buffer when the packet is sent by the data splitter 31. In this case, the parameter extractor 33 may not be able to reconstitute the full content of the communication from the client and will thus typically be unable to extract the correct parameters and/or inform the server 20 of the stream to which the parameters relate. This could disrupt communications with the client and cause the entire scheme implemented by the system 30 to break down.

To address this, the data splitter 31 may be configured such that it will only send a packet (or at least the associated communication state information) to the server 20 once it knows that the packet (or at least the associated payload information and information necessary to properly re-assemble the stream and/or inform the server of the stream to which the extracted parameters apply) has been successfully delivered to the parameter extractor 33. This can be achieved by implementing signalling between the parameter extractor 33 and the data splitter 31.

In order to implement signalling between the parameter extractor 33 and the data splitter 31, there should be a reliable communication link between the data splitter 31 and the parameter extractor 33.

In some embodiments described above, which do not enforce unidirectional dataflow between the parameter extractor 33 and data splitter 31, this can be achieved without any modification of the system 30.

However, in embodiments in which the system 30 enforces unidirectional dataflow between the parameter extractor 33 and the data splitter 31, using unidirectional dataflow enforcer 32 for example, the unidirectional dataflow should be enforced in a manner that allows the reverse signalling to be communicated to the data splitter 31. For example, if the unidirectional dataflow is enforced using a physically unidirectional data path, a separate physical link for signalling can be provided (out of band signalling). Alternatively, signalling can take place on the same physical path (in band signalling). In this case the unidirectional dataflow enforcer 32 (which may be implemented at the data splitter 31) can be configured to allow the data splitter 31 to receive the signalling (predefined signalling, for example), even though the data splitter 31 may be configured to ignore or not process other data received from the parameter extractor 33. In either case, however, a communication link for signalling packet delivery could be used as a covert channel to carry information from the parameter extractor 33. For example, the parameter extractor 33 may covertly send information by encoding information into the timing of the reverse signals.

To address this, the data splitter 31 may be implemented such that it ensures that any information which might be carried in the reverse signalling channel cannot propagate further than the data splitter 31. In other words, information which might be carried in the reverse signalling channel cannot make its way outside of the system 30. In the case that the data splitter were implemented using software, this could be achieved using careful software design. However, given the importance of avoiding compromise of the data splitter in order to maintain security, it may be preferable for the data splitter to be implemented using technologies such as an FPGA or an ASIC, in which case control of the reverse signalling channel would be implemented using suitable digital logic.

Possible implementations of the various functional elements of the system 30 will now be described. It should be appreciated, however, that the invention described herein is not limited to any specific implementation and that the implementation can be chosen according to the particular needs of the system and cost. For example, the entirety of the system 30 could be implemented in software in a single physical unit.

The functionality of the data splitter 31 is relatively simple and can therefore be implemented using a high assurance approach. That is, the data splitter 31 can be implemented in a manner such that the operator of the system 30 can have a high level of confidence that the data splitter will not become compromised, even though it is exposed to raw communications from the client 10. Examples of high-assurance approaches include implementation in hard-wired logic, via ASIC or PLD, implementation using a FPGA, or using formally verifiable software instructions which may be stored in a read only memory. Such approaches are difficult to compromise because the functionality may be difficult, if not impossible, to modify without access to the internals of the physical unit, or because the software instructions used are formally verified and therefore known to a high degree of confidence not to include any flaws that could be exploited.

The functionality of the parameter extractor 33 is considerably more complex, requiring the interpretation of multiple communication layers, including the processing of protocols including TCP/IP, TLS and HTTP, as well as the application of extraction rules which will have varying degrees of complexity. This makes it difficult to implement the parameter extractor 33 in a high assurance manner. It is therefore expected that the parameter extractor 33 will be implemented at least partly in software, and may be vulnerable to compromise. As explained above, in some embodiments, the parameter extractor includes a logic block that runs software instructions that implement its functionality, and the logic block obtains its boot instructions from a separate storage controller 40 that is protected from the external network. The logic block can obtain the boot instructions over a boot interface upon power-up or reset of the logic block, with this behaviour not being alterable by instructions running on the logic block and the boot interface being implemented in a high assurance manner.

The complexity of the functionality of the parameter validator 35 will vary depending on the functionality of the web server 20. In some cases the web server functionality may be sufficiently simple that the parameter validator 35 can be implemented in a high assurance manner, using hard-wired logic, an ASIC or PLD, an FPGA, or using formally verifiable software instructions which may be stored in a read only memory, for example. In other cases the parameter extractor 35 will need to be implemented using lower assurance approaches. In both cases, however, the addition of the second unidirectional dataflow 34 enforcer between the parameter extractor 33 and the parameter validator 35 reduces the risk of the parameter validator becoming compromised. This is because it restricts efforts by a compromised parameter extractor 33 to compromise the parameter validator 35 to manipulation of the content of the parameters passed to it. The implementation of the second unidirectional dataflow 34 enforcer in a high assurance manner, explained below, provides additional security.

Any of the first, second and third unidirectional dataflow enforces 32, 34 and 36 may be implemented in hardware, software, or a combination of the two. Their functionality may be implemented physically or logically separate to other elements. Alternatively, their functionality may be implemented physically or logically together with one or more of the other elements. For example, the first unidirectional dataflow enforcer 32 may be implemented completely physically separately, or could be implemented as part of the data splitter 31 and/or the parameter extractor 33. Similarly, the second unidirectional dataflow enforcer 34 may be implemented completely physically separately, or could be implemented as part of the parameter validator 35 and/or the parameter extractor 33.

In one implementation which is considered particularly secure, a unidirectional dataflow enforcer is implemented in hardware using an optical link. In this implementation, one side of the unidirectional dataflow enforcer includes, or is coupled to, optical transmission hardware such as a laser, and the other side of the unidirectional dataflow enforcer is coupled to a receiver but no transmission hardware. This only allows the transmission of in one direction because only one side of the unidirectional dataflow enforcer include an optical transmitter, and because only one side includes optical receiver. It is not physically possible for data to flow in one direction. It will be understood that this implementation could make use of a medium for carrying the optical signal, such as an optical fibre. Alternatively, there may not be such a medium, in which case a line of sight between the transmitter and receiver may be necessary.

In an alternative hardware implementation, a unidirectional dataflow enforcer is one electrical transmission connection of a connection that uses different electrical connections for each direction of communication. For example, the connection may be one connection of a serial port according to the RS-232 standard. Data can flow in one direction, but the hardware controlling the RS-232 link would not allow data to flow in the opposite direction.

A further approach typically considered to be high-security is to create a low level custom electronic hardware device, such as an ASIC, FPGA or a PLD, to enforce unidirectionality. Such a device may enforce unidirectionality entirely through hardware, by physically hardwiring the functionality, or through a combination of hardware and software using, for example, a configuration in which an FPGA is programmed by software running on a system which is connected to the FPGA programming pins, such that the FPGA can only be reconfigured by this system and not by systems that are sending or receiving data via the unidirectional channel enforced by the FPGA.

In another implementation, unidirectionality may be enforced by software running on a processor. Such software could be developed using high assurance development methods. However, there is always a risk that the software (or any other system elements on which it depends, such as an operating system or CPU) could contain a vulnerability which could be exploited by suitably crafted communications. Thus, higher security approaches such as those described above may be preferred.

The server 20 may be implemented in any number of ways, as will be appreciated by those skilled in the art. In some embodiments the server 20 and system 30 are implemented together. In some embodiments the functionality of the server may be implemented using a number of different logical processes, and may be distributed over a number of different physical processors. In one embodiment the server 20, while shown as a single physical unit in FIG. 1, includes two processes: one process which manages the state of the connection (e.g. TCP) using the communication state information, and another process which receives parameters from the parameter extractor 33 (optionally via the parameter validator 35) and prepares a response which is then sent to the first process to be put into packets for transmission to the client 10. In such an example unidirectionality may be enforced between these two server processes.

FIG. 2 illustrates a message flow between the client 10, data splitter or clearance block 31, parameter extractor 33 and server 20 for the example of a HTTP GET request over TCP.

While FIG. 2 and the above description generally refers to TCP, it should be appreciated that other communication protocols can be used with the systems 30 embodying the present invention. TCP is given as the primary example because it is the most commonly used protocol for network-based transmission, but embodiments of the invention are not limited to TCP. Also, while embodiments of the present invention advantageously allow the state of connection-oriented communication sessions to be maintained, the system can be used with connectionless protocols too.

Further, while FIG. 2 and the above description generally refers to the HTTP GET and POST requests, this is by way of an example only and other kinds of communications are consistent with embodiments of the present invention.

Turning to the message flow of FIG. 2, the client 10 initiates a communication session with the server 20 by sending a TCP SYN message 200 to the server 20, which is received by the intermediate system 30 at the data splitter 31.

As will be understood from the previous description, the data splitter 31 may process received communications to remove payload information to produce cleared data that includes communication state information, and forwards the cleared data to the server 20. This is shown as TCP SYN 201 in FIG. 2. In other embodiments, the data splitter 31 instead forwards the communication without removing payload information, and the server 20 is configured to ignore the payload information. It will be appreciated by those skilled in the art that a TCP SYN does not include any payload information, such that the data splitter 31 effectively just forwards TCP SYN 200 to the server 20 as TCP SYN 201, regardless of whether the data splitter 31 is configured to process or simply forward communications.

In the example of FIG. 2, the data splitter 31 also forwards the received TCP SYN 200 to the parameter extractor 33 (optionally via the first unidirectional dataflow enforcer 32). This is shown as TCP SYN 202 in FIG. 2. However, it should be appreciated that in some embodiments the data splitter 31 does not forward the TCP SYN to the parameter extractor 33 because the TCP SYN does not include any payload.

Parameter extractor 33 performs predefined parameter extraction rules on received communications to extract parameters. In the case of a TCP SYN, there is no payload and so no parameters are extracted from the TCP SYN. Therefore, in FIG. 2, regardless of whether or not the data splitter 31 forwards the TCP SYN to the parameter extractor 33, no parameters are forwarded from the parameter extractor 33 to the server 20 following the receipt of TCP SYN 202.

Having received the communication state information from the data splitter 31, embodied in this case by TCP SYN 201, the server 20 makes a protocol level response to the client 10 in the form of TCP SYN ACK 203.

Having received the TCP SYN ACK 203 from the server 20, the client 10 completes the three-way handshake by issuing a TCP ACK 204 which is again forwarded by the data splitter 31 to both the server 20 (as TCP ACK 205) and the parameter extractor 33 (as TCP ACK 206). The TCP communication session between the client 10 and the server 20 has now been initiated, and the client 10 issues an HTTP GET request 207. HTTP GET request 207 is received by the intermediate system 30 at data splitter 31.

The data splitter 31 processes HTTP GET request 207 to remove payload information (by removing or overwriting the payload with meaningless data, for example) to leave cleared data that includes communication state information (some or all of the TCP header, for example). The data splitter 31 forwards the cleared data to the server block 20 as Empty TCP message 208.

The data splitter 31 also forwards the received TCP packet whose payload contains the HTTP GET request 207 to the parameter extractor 33 as HTTP GET request 209. In this example it is assumed that the HTTP GET request is contained in a single TCP packet, but the case where the HTTP GET request spans multiple TCP packets is equally possible.

Having received the Empty TCP message 208 that includes communication state information (packet sequence numbers and acknowledgement numbers included in the TCP header), the server 20 responds to the client 10 with a TCP ACK 210. TCP ACK 210 has the appropriate packet sequence and acknowledgement numbers for maintaining the state of the TCP communication session.

The parameter extractor 33, having received the HTTP GET request 209, applies the predetermined parameter extraction rules to the HTTP GET request 209 in order to obtain a set of parameters. These parameters are forwarded to the server 20, optionally via the second unidirectional dataflow enforcer 34 and parameter validator 35, and are indicated in FIG. 2 by GET parameters 211.

Having received the GET parameters 211 from the parameter extractor 33, the server 20 formulates an appropriate response to the HTTP GET request. As will be appreciated by those skilled in the art, this may involve the server 20 retrieving data specified by the GET parameters and that the server 20 has access to. For example, the server may retrieve a webpage, image or video specified by the GET parameters. The server then responds to the client's HTTP GET request with the retrieved data, as indicated by HTTP response 212 in FIG. 2.

Having received the response 212 to its HTTP GET request 207, the client 10 responds to the server 20 with a TCP ACK 213, which is received by the intermediate system 30 at the data splitter 31.

The data splitter 31 processes the received TCP ACK 213 to remove payload information (of which there is none) to give cleared data and forwards the cleared data to the server 20, as TCP ACK 214.

The data splitter 31 may also forward TCP ACK 210 to the parameter extractor 33, as TCP ACK 215. As there is no payload information in the TCP ACK 213, 215, the parameter extractor does not extract any parameters and does not forward anything to the server. As explained above for TCP SYN 202, since TCP ACK 213 does not include any payload information, the data splitter 31 may instead not forward anything to the parameter extractor 33.

Finally, having received of TCP ACK 214 the server, recognizing it as an ACK, does not respond. This completes the message flow for a single HTTP GET request sent over TCP.

Referring to FIG. 3, this sequence diagram illustrates the initiation of an encrypted communication session between the client 10 and the server 20 in accordance with embodiments of the present invention.

It is often desirable for communication sessions over networks such as the Internet to be encrypted, as the session may involve the exchange of sensitive data. Embodiments of the present invention allow for encrypted communication sessions, with the parameter extractor 33 decrypting encrypted communications received from the client 10 and the server 20 encrypting communications before sending them to the client, as it normally would.

However, many encryption methodologies and modalities involve the derivation of encryption parameters, such as encryption keys, at the start of a communication session. This typically involves the use of a combination of pre-defined secret data and data exchanged during initial communications at the start of the communication session. For such encryption methodologies, the parameter extractor may need to be provided with the predefined data in order for the parameter extractor 33 to be able to derive a key. In some of the embodiments described herein, the server 20 can provide the parameter extractor 33 with the predefined data at any time. Other embodiments, however, enforce unidirectional dataflow between the server 20 and the parameter extractor 33 such that the server 20 cannot provide the parameter extractor with the predefined encryption-related data. In these cases, for these encryption methodologies, it may be necessary to preconfigure the parameter extractor 33 with the predefined encryption-related data.

The precise details of the encryption-related data with which parameter extractor 33 should be preconfigured will depend on the implementation, for example on the communication protocol and the key exchange modalities that are to be supported. There are, for example, a number of well-known key exchange modalities supported by TLS. These include, but are not limited to, RSA, diffie-hellman, pre-shared diffie-hellman key exchange, diffie-helmann with ephemeral keys, elliptical curve diffie-helmann and elliptical curve diffie-helman with ephemeral keys. By way of some specific examples, the parameter extractor 33 may be preconfigured with the server certificate. In the case of diffie-hellman key exchange, the parameter extractor 33 may be preconfigured with the diffie-dellman parameters. In the case of pre-shared diffie-hellman key exchange, the parameter extractor 33 may be preconfigured with the pre-shared key. As noted above, the precise details will depend on the chosen protocols and key exchange modalities. Those skilled in the art will be aware of other modalities and will recognize the encryption-related data with the parameter extractor 33 described herein would need to be preconfigured.

Similarly, for some encryption methodologies, for the server to be able to derive the encryption key with which to encrypt data before sending it to the client, it is necessary for the parameter extractor 33 to provide the server 20 with encryption-related data it has extracted from communications received from the client 10. Therefore, the predefined parameter extraction rules can include one or more rules for extracting an encryption-related parameter such as a key exchange parameter (a client random string and/or a pre-master secret, for example).

Turning now to the sequence diagram of FIG. 3, this illustrates how an encrypted TLS session can be established using the RSA key exchange system, in accordance with embodiments of the present invention. Those skilled in the art will recognize that certain steps and messages specified in the TLS standard are omitted or combined in FIG. 3. This is for ease of explanation. Further, FIG. 3 only illustrates one example: alternative implementations are also possible.

It should be appreciated that, for clarity, FIG. 3 does not show any TCP protocol-level message exchange, and this will not be described. In other words, FIG. 3 does not show TCP SYN, TCP ACK and TCP SYN ACK messages and these will not be described. The processing of communications by the data splitter 31 to remove payload information, and the forwarding of cleared data including communication state information to the server 20, will also not be described.

To begin the session, the client 10 sends the server 20 a message, ClientHello 300. As those skilled in the art will appreciate, in TLS, ClientHello is used to inform the server 20 of the client's capabilities to agree on, for example, a protocol version, cipher suite and compression method. ClientHello is also used to inform the server of a randomly generated string, 'Client random string'.

ClientHello 300 is received by the intermediate system 30 at the data splitter 31. Having received ClientHello 300 from the client 10, the data splitter 31 forwards the message to the parameter extractor 33 as ClientHello 301, optionally via the first unidirectional dataflow enforcer 32.

Having received ClientHello 301 from the data splitter 31, the parameter extractor 33 applies the predefined parameter extraction rules to ClientHello 301 and retrieves a set of parameters that includes the Client random string that was generated by the client. The Client random string is included in the set of parameters, 'A' 302, that is sent from the parameter extractor 33 to the server 20, optionally via the second unidirectional dataflow enforcer 34 and parameter validator 35.

Additionally, in FIG. 3, the parameter extractor 33 generates a random string 'Server random string' and includes this in the set of parameters, A 302, that it sends to the server 20. This is necessary in some embodiments because the parameter extractor 33 must have knowledge of the Server random string, yet may not be able to obtain knowledge of the Server random string if it is generated by the server. This is because the system 30 may enforce unidirectional dataflow between the server 20 and the parameter extractor 33. However, in embodiments which do not enforce unidirectional dataflow between the server 20 and the parameter extractor 33, the server 20 may instead generate the Server random string and provide this to the parameter extractor 33.

The server 20, in receipt of the Server random string and Client random string, responds to the client 10 with a 'ServerHello' message 303. In the simplified example of FIG. 3, the ServerHello message informs the client 10 of the Server random string and the RSA public key of the server certificate. ServerHello 303 is also used to agree on, for example, a protocol version, session ID, cipher suite and compression method that is to be used for the remainder of the session. Those skilled in the art will appreciate that, in accordance with the TLS standard, there may actually be three separate messages here: ServerHello, ServerCertificate and ServerHelloDone which are used to exchange the necessary information. However, for simplicity, these three messages are combined into a single message ServerHello 303 in FIG. 3.

The client 10 now sends the server 20 a message, ClientKeyExchange 304. The ClientKeyExchange message 304 includes, in an encrypted form, a client-generated 'pre-master secret'. As will be understood by those skilled in the art, the pre-master secret is encrypted using on the server 20's RSA public key included in the server certificate.

ClientKeyExchange 304 is received by the intermediate system 30 at the data splitter 31. Having received ClientKeyExchange 304 from the client 10, the data splitter 31 forwards the message to the parameter extractor 33 as ClientKeyExchange 305, optionally via the first unidirectional dataflow enforcer 32.

Having received ClientKeyExchange 305 from the data splitter 31, the parameter extractor 33, which is preconfigured with the server certificate, uses the RSA private key, to decrypt the ClientKeyExchange message 305 in order to retrieve the pre-master secret. The parameter extractor 33 then sends the pre-master secret in the set of parameters, B 306, that it sends to the server 20, optionally via the second unidirectional dataflow enforcer 34 and parameter validator 35.

Both the server 20 and the parameter extractor 33 are now in a position to calculate the session key, by making use of the client random string, server random string and pre-master secret.

The server 20, having received the decrypted pre-master secret from the parameter extractor 33, now sends 'ChangeCipherSpec, Finished' messages 307 to the client 10, to which the client 10 responds with its own 'ChangeCipherSpec, Finished' messages 308, which are received by the system 30 at the data splitter 31 and forwarded to the parameter extractor 33 as ChangeCipherSpec, Finished 309. Those skilled in the art will appreciate that the ChangeCipherSpec messages/protocol, which signal that the handshake process is complete, is simplified in FIG. 3 for ease of explanation.

The parameter extractor 33, having received ChangeCipherSpec, Finished 309, applies predefined parameter extraction rules to the message and extracts a parameter, C, which it sends to the server block 20 as message 310, which completes the handshake process and establishes the encrypted TLS communication session.

With the encrypted communication session established, the client 10 sends encrypted data to the server 20 as 'Encrypted data' 310. This is received by the intermediate system 30 at the data splitter 31.

Not shown in FIG. 3, data splitter 31 processes the communication 310 to remove payload information, leaving cleared data that includes communication state information, and forwards the cleared data to the server 20. It will be understood that although the payload of the message 310 is encrypted, the communication state information, which is included in the TCP header, is not encrypted and is separate to the encrypted payload. The data splitter 31 can therefore remove payload information and forward communication state information to the server 20 despite the encryption.

The data splitter 31 also forwards the Encrypted data message 310 to the parameter extractor 33, optionally via the first unidirectional dataflow enforcer 32, as 'Encrypted Data' message 311.

The parameter extractor 33, having received the Encrypted Data message 311, decrypts the message using the encryption-related data with which it is preconfigured and which it has learned from the handshake process. The parameter extractor 33 then applies the predefined parameter extraction rules to the decrypted message in order to obtain a set of parameters, which it forwards to the server 20 as message 312, optionally via the second unidirectional dataflow enforcer 34 and the parameter validator 35.

The server 20, having received the set of parameters 312 from the parameter extractor 33, formulates a suitable response using the parameters, as has been described above. This response is encrypted and sent to the client 10 as 'Encrypted Data' message 313.

Described above are a number of embodiments with various optional features. It should be appreciated that, with the exception of any mutually exclusive features, any combination of one or more of the optional features are possible.

The invention claimed is:

1. A system for protecting a server from network attacks, the system comprising a data splitter and a parameter extractor, the data splitter being configured to:
receive network communications from a client;
send network data comprising at least payload information included in the received network communications to the parameter extractor; and
send network data comprising at least communication state information included in the received network communications to the server;
the parameter extractor being configured to:
apply predefined parameter extraction rules to network data received from the data splitter in order to extract parameters, and to forward extracted parameters to the server,
wherein the system is configured to enforce unidirectional dataflow over at least part of the network connection path to the server via the parameter extractor, such that dataflow to the server over the network connection path is allowed, but dataflow in the opposite direction is not allowed for at least part of the network connection path.

2. A system according to claim 1, wherein the data splitter is further configured to process the received network communications to remove payload information to produce cleared data, the cleared data comprising communication state information included in received network communications, and wherein sending network data to the server comprises sending the cleared data to the server.

3. A system according to claim 2, wherein processing received network communications to produce cleared data comprises overwriting a payload of a received network communication, optionally with zeroes or other meaningless data.

4. A system according to claim 2, wherein processing received network communications to produce cleared data comprises removing a payload of a received network communication.

5. A system according to claim 1, configured to enforce unidirectional dataflow over at least part of the network connection path between the parameter extractor and the server, such that dataflow from the parameter extractor to the server over the network connection path is allowed, but dataflow from the server to the parameter extractor over the network connection path is not allowed.

6. A system according to claim 1, configured to enforce unidirectional dataflow over at least part of the network connection path between the parameter extractor and the client.

7. A system according to claim 1, configured to enforce unidirectional dataflow over at least part of the network connection path between the data splitter and the parameter extractor, such that dataflow from the data splitter to the parameter extractor over said network connection path is allowed, but dataflow from the parameter extractor to the data splitter over said network connection path is not allowed.

8. A system according to claim 1, wherein the parameter extractor is configured to signal to the data splitter to confirm when it has successfully received network data from the data splitter, and wherein the data splitter is configured to only send network data to the server when the parameter extractor has signalled that it has successfully received the network data sent by the data splitter.

9. A system according to claim 1, wherein the parameter extractor is configured to extract one or more GET parameters from HTTP GET requests.

10. A system according to claim 1, wherein the parameter extractor is configured to extract one or more POST parameters from HTTP POST requests.

11. A system according to claim 1, wherein the communication state information comprises information for maintaining a stateful communication session for a connection-oriented communication protocol.

12. A system according to claim 1, further comprising a parameter validator located between the parameter extractor and the server, the parameter validator being configured to:
  receive extracted parameters from the parameter extractor;
  apply predefined rules for implementing predefined validation criteria to the received parameters; and
  send parameters meeting the predefined validation criteria to the server.

13. A system according to claim 12, configured to enforce unidirectional dataflow between the parameter extractor and the parameter validator, such that dataflow from the parameter extractor to the parameter validator is allowed, but dataflow from the parameter validator to the parameter extractor is not allowed.

14. A system according to claim 12, configured to enforce unidirectional dataflow between the parameter validator and the server, such that dataflow from the parameter validator to the server is allowed, but dataflow from the server to the parameter validator is not allowed.

15. A system according to claim 1, wherein the parameter extractor is preconfigured with encryption-related data of the server so that the system can establish encrypted communication sessions with network-based clients.

16. A system according to claim 1, wherein the parameter extractor is preconfigured with encryption-related data of the server so that the parameter extractor can generate a secret key from extracted parameters, so that the parameter extractor can decrypt network communications received from the data splitter.

17. A system according to claim 1, further comprising the server.

18. A system according to claim 17, wherein the server is configured to formulate responses to the network communications received by the data splitter using the parameters received from the parameter extractor.

19. A system according to claim 17, wherein the server is configured to formulate protocol-level responses to network communications received by the data splitter using the communication state information included in the data received from the data splitter.

20. A method for protecting a server from network attacks, the method comprising:
  receiving network communications from a client at a data splitter;
  sending network data comprising at least payload information included in the received network communications from the data splitter to a parameter extractor;
  sending network data comprising at least communication state information included in the received network communications from the data splitter to the server; and
  applying, by the parameter extractor, predefined parameter extraction rules to the network data received from the data splitter in order to extract parameters, and forwarding extracted parameters to the server; and
  enforcing unidirectional dataflow over at least part of the network connection path to the server via the parameter extractor, such that dataflow to the server over the connection path is allowed, but dataflow in the opposite direction is not allowed for at least part of the network connection path.

* * * * *